Figure 1:
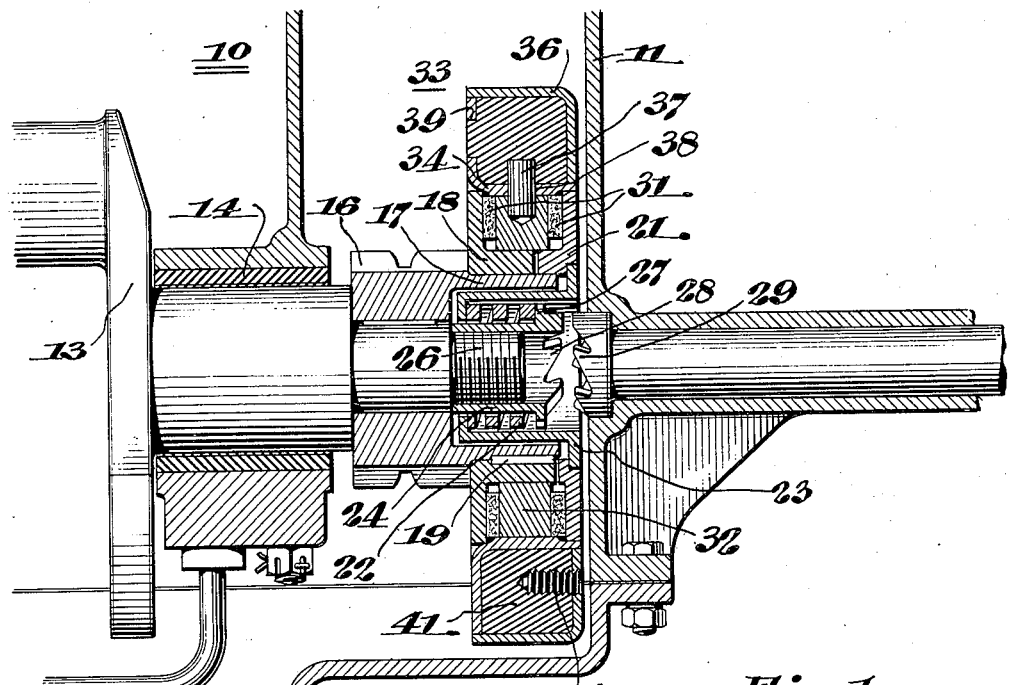

Nov. 5, 1929.  A. MOORHOUSE  1,734,267

INTERNAL COMBUSTION ENGINE

Filed Nov. 14, 1925

Inventor
Alfred Moorhouse
By Miller Sibbits
Attorney

Patented Nov. 5, 1929

1,734,267

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed November 14, 1925. Serial No. 69,010.

This invention relates to internal combustion engines and particularly to vibration damping apparatus therefor of the type disclosed in U. S. Patent No. 1,085,443, granted January 27, 1914 to Lanchester.

It has for one of its objects to provide an inertia member for use in vibration damping apparatus in which a relatively heavy mass shall be secured in a relatively small space.

Another object of the invention is to provide a fly-wheel for a vibration damper which shall be strong to resist bursting stresses caused by rotation at high speed.

Another object of the invention is to provide such an inertia member which shall be simple and strong in construction and inexpensive to manufacture.

Figure 2:
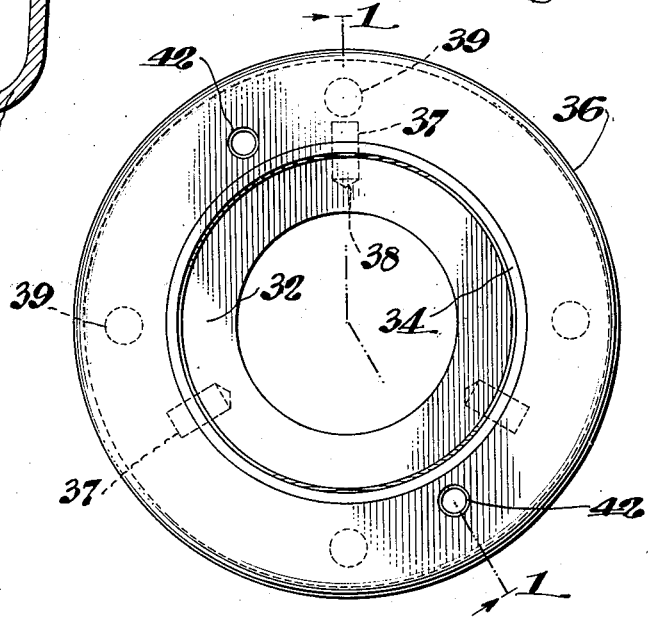

Other objects of the invention will appear from the following description taken in connection with the drawing which forms a part of this specification and in which:

Fig. 1 is a view in longitudinal section substantially on the line 1—1 of Fig. 2, through a portion of an internal combustion engine equipped with vibration damping apparatus in accordance with the present invention, and Fig. 2 is a view in front elevation of the fly-wheel of the vibration damper shown in Fig. 1.

In the construction of the fly wheels or other inertia members for vibration dampers, it is necessary not only that such member have a weight sufficient to yield the desired inertia effect, but that it have adequate strength to resist the bursting stresses set up at high engine speeds. Accordingly these members have been almost invariably constructed of iron or steel, which metals have sufficient strength. It has been found, however, that large, high-speed engines require the damping of vibrations which have considerable energy, and that fly-wheels as heretofore constructed, when of a size sufficient to provide the mass requisite to the necessary inertia, became unduly large and cumbersome. In the present invention is provided an inertia member of relatively small physical dimensions and having a relatively large mass, so constructed as to be adequately strong to stand the centrifugal forces developed at any possible engine speed.

Referring to the drawings, at 10 is shown a portion of an internal combustion engine, having a crank case 11 and a sump or pan 12, and having a crank shaft 13 journaled in appropriate bearings 14 in the well known manner. The forward end of the crank shaft 13 is of reduced diameter and is provided with a chain sprocket 16, keyed to the shaft to rotate therewith, and adapted to drive the engine cam shaft and other engine accessories (not shown).

The sprocket 16 has a forwardly projecting hollow portion 17 on which the engine vibration damper is mounted. This vibration damper has a two part hub member, one of the parts 18 of which is keyed to the sprocket extension 17 to rotate therewith, as shown at 19, the other part 21 being connected to the part 18 by jaws or splines (not shown) so as to rotate therewith, but which permit relative axial movement between the parts. Each of the parts 18 and 21 has an axially disposed portion mounted on the extension 17, and a radially disposed flange. The member 21 is urged axially toward the member 18 by a spring 22, acting through a member 23 disposed within the hollow portion 17 and which has an inturned flange at one end to engage the spring and an out-turned flange at the other end to engage the member 21. The spring 22 is secured to the shaft 13 by a nut member 24 threaded on to a portion 26 at the end of the reduced portion of the shaft. The nut 24 is provided near its outer end with a circumferential shoulder forming an abutment 27 for the spring 22, and this nut may also be provided with suitable jaws 28 to engage similar jaws on a starting crank shaft 29 if desired.

Mounted upon the axially disposed portions of the members 18 and 21 but capable of rotation independently thereof is the inertia member of the damper, which in the present embodiment of the invention consists of a fly-wheel comprising a web portion or ring 32 rigidly secured to a rim portion 33. The ring 32 is mounted between and in frictional engagement with discs 31, which are urged axially toward the ring by the flanges of the members 18 and 21 respectively, in such a manner that any relative rotation between this ring and the hub portion of the damper is resisted by the frictional engagement of the discs 31 in a manner well understood in the art to which this invention relates. In the operation of the damper the fly-wheel is brought up to and maintained substantially at crank shaft speed by the frictional drive afforded through the discs 31, its inertia tending to maintain its speed constant. Relatively slow changes in the speed of the shaft are accompanied by a corresponding change in the speed of the fly-wheel as will be readily understood. Rapid accelerations or decelerations of the shaft, however, such as are produced by a torsional vibration therein, are not immediately followed by the frictionally driven fly-wheel, so that the momentum of this fly-wheel is exerted to increase the speed of the shaft upon a sudden deceleration thereof and is exerted to retard or brake the shaft upon a sudden acceleration thereof, these forces being exerted through the engagement of the ring 32 with the friction discs 31. In this way the momentum of the fly-wheel, which tends to remain a constant, resists sudden changes in speed of the engine shaft in both directions and accordingly exerts a damping effect upon torsional vibration in this shaft.

The rim portion 33 of the fly-wheel comprises an inner member 34 and an outer member 36 preferably stamped from some metal of relatively great strength although of relatively low density, such as sheet steel. Each of these members has a radially disposed flange and an axially disposed portion, which fit together snugly in the manner indicated, sufficiently close to form a circular box or casing for the rim portion 33 of the fly-wheel, being thus interlocked against separation by radial movement, in which direction the stresses caused by rotation are exerted.

The ring 32 of the fly-wheel is provided with suitably spaced dowel pins 37, which are driven into tightly fitting dowel holes 38 through corresponding holes in the axially disposed portion of the inner member 34 so that these members are rigidly secured together. The ends of these dowel pins 37 thus project radially into the casing formed by the stampings 34 and 36 after these are assembled. The radial flange of the inner member 34 is also provided with a number of circumferentially spaced holes 39.

The circular box or casing just described is adapted to be filled with any suitable material of relatively great density and corresponding weight, as indicated at 41 in Fig. 1. This filler need not possess any great mechanical strength and it may accordingly be provided by any easily fusible metal, such as lead, which is preferably introduced in a molten state through suitable openings in the fly-wheel casing and allowed to cool therein. This procedure serves to embed the ends of the dowel pins 37 in the filling material, so that they serve as anchors therein by which the filler is prevented from shifting in the casing.

In the construction of a fly-wheel of this nature the inner rim member 34 is preferably first rigidly secured to the ring 32 by means of the dowel pins 37, and this assembly and the outer member 36 are then thoroughly cleaned and tinned in a tinning bath of well known form. The members 34 and 36 are then assembled in juxtaposition so as to form the circular box or casing of the fly-wheel rim, which casing is then laid on its face, the holes 39 being uppermost. A suitable pouring jig or plate having holes arranged in communication with the holes 39 is then placed upon the casing and molten lead introduced through one of these holes from a ladle until the interior of the casing is completely filled with lead, the molten lead overflowing through the other holes 39. This lead filler adheres closely to the tinned surface of the casing forming a strong bond therewith. After the lead has cooled and hardened, the sprues projecting through the holes 39 are broken off and smoothed down flush with the inner face.

The other face of the fly-wheel is then drilled and tapped, as indicated at 42, for the reception of bolts (not shown) by means of which the fly-wheel may be held stationary while the crank shaft is rotated to test the frictional drag of the discs 31. This drag may be adjusted by tightening or loosening the nut 24 as required, thus increasing or decreasing the tension of the spring 22. After such test has been completed, the bolts are removed from the holes 42.

It will be evident that by this construction is provided a vibration damper having a fly-wheel of which the mass, and accordingly the inertia is very great, but which is not of such large physical dimensions as to render its use in the ordinary internal combustion engine impossible. It will also be observed that by reason of the strong steel casing which supports the lead filler, and its anchorage to the ring member 22, this fly-wheel is of ample strength to resist the centrifugal forces tending to cause bursting of the rim at high speeds.

It will be understood that various forms of the invention other than those described above may be used without departing from the spirit or scope of the invention.

What is claimed and desired to be secured by Letters Patent is:

1. A fly-wheel having a rim portion comprising cooperating inner and outer members of stamped sheet metal, a ring adjacent the inner member, dowel pins in the ring extending through said inner member securing the ring thereto, and a heavy filler for said rim portion surrounding the ends of the pins.

2. A fly-wheel having a rim portion formed of inner and outer stampings each having an axially disposed part and a radially disposed part and cooperating to form a closed circular box, and a heavy metal completely filling said box.

3. A fly-wheel having a rim portion formed of inner and outer stampings each having an axially disposed part and a radially disposed part and cooperating to form a circular box, a cast filling of heavy metal for said box, and means secured to the inner stamping and embedded in said filling to anchor the inner stamping thereto.

4. A fly-wheel having a rim portion comprising two sheet metal stampings cooperating to form a circular box, a filler for said box of heavy easily fusible metal cast therein, and anchor members secured in one of the stampings and embedded radially in said cast metal.

5. A fly-wheel having a rim portion comprising steel stampings interlocked against separation in a radial direction, a cast filler for said stampings, and anchor members embedded in said filler to prevent shifting of the filler in said stampings.

6. An inertia member comprising a ring, a stamped rim portion forming a circular box having holes therein, a heavy metal filler cast in said box and projecting into said holes, and positioning means on the ring extending into said box and embedded in said filler.

In testimony whereof I affix my signature.
ALFRED MOORHOUSE.